United States Patent [19]

Moffatt

[11] Patent Number: 5,061,316
[45] Date of Patent: Oct. 29, 1991

[54] PH-INSENSITIVE ANTI-KOGATING AGENT FOR INK-JET PENS

[75] Inventor: John R. Moffatt, Corvallis, Oreg.

[73] Assignee: Hewlett-Packard Company, Palo Alto, Calif.

[21] Appl. No.: 509,253

[22] Filed: Apr. 12, 1990

[51] Int. Cl.[5] .............................................. C09D 11/02
[52] U.S. Cl. ........................................ 106/22; 106/20
[58] Field of Search ................................... 106/20, 22

[56] References Cited

U.S. PATENT DOCUMENTS

| 4,163,675 | 8/1979 | Hirano et al. | 106/22 |
| 4,256,493 | 3/1981 | Yokoyama et al. | 106/26 |
| 4,702,742 | 10/1987 | Iwata et al. | 106/22 |

Primary Examiner—William R. Dixon, Jr.
Assistant Examiner—Helene Klemanski

[57] ABSTRACT

Organic acid sulfonates, such as sodium methane sulfonate, sodium 4-toluenesulfonate and sodium propene-1-sulfonate, serve as additives for use in thermal ink-jet inks to reduce kogation significantly. The addition of such substances essentially eliminates kogation for the life of ink pens.

21 Claims, 8 Drawing Sheets

PH-INSENSITIVE ANTI-KOGATING AGENT FOR INK-JET PENS

TECHNICAL FIELD

The present invention relates to inks used in ink-jet printers, and, more particularly, to an ink used in thermal ink-jet printers having improved kogation properties.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an inkjet pen.

In operation, each resistor element is connected via a conductive trace to microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

A problem with inks used in such thermal ink-jet printers is that the repeated heating of the resistor element over several hundreds of thousand or over millions of firings can cause breakdown of the ink, with consequent fouling of the surface of the resistor element. This process has been termed "kogation", which is defined as the build-up of residue (koga) on the resistor surface. The build-up of residue degrades pen performance.

Various ink compositions and processes have been developed in an effort to reduce kogation. For example, in the anionic dyes (sulfonate or carboxylate) commonly employed in aqueous inks used in thermal ink-jet printing, sodium is generally the counter-ion used. However, while dyes containing sodium counter-ions generally provide good print quality, sodium counter-ions have been found to contribute to the kogation problem.

One solution has been to partially or totally eliminate sodium. Successful replacement counter-ions are lithium and tetramethylammonium.

The need remains for the development of inks having reduced kogation, and hence longer life, using low cost chemicals with minimal additional processing.

DISCLOSURE OF INVENTION

In accordance with the invention, organic sulfonic acid salts added to the ink reduce and may even substantially eliminate kogation compared to inks not containing such acid salts. The organic sulfonic acid salts, such as sodium methane sulfonate, are not pH sensitive in aqueous solutions and are soluble with anionic and cationic dyes at concentrations less than about 6 wt %.

BEST MODES FOR CARRYING OUT THE INVENTION

Figure 1B:
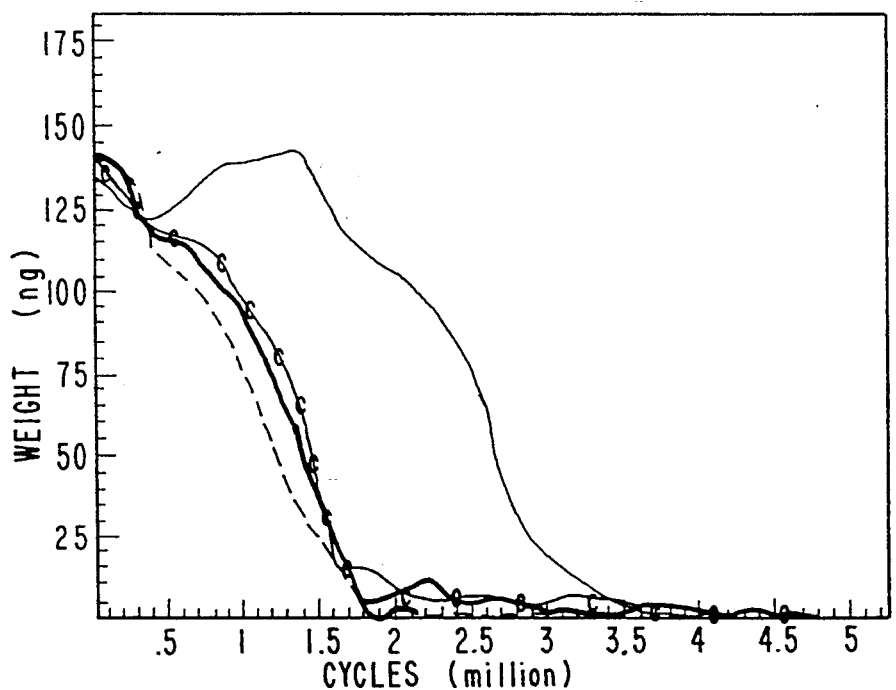
FIG. 1, on coordinates of weight (in nanograms, ng) and number of cycles (resistor firings), is a plot of drop weight versus cycles for three different energies of an ink not including the additive of the invention, depicting the effect of kogation on drop weight out to 0.4 million cycles (FIG. 1a) and out to 5 million cycles (FIG. 1b)

Inks benefitted by the practice of the invention comprise a vehicle and a dye. The vehicle typically comprises one or more water-soluble organic compounds, such as a glycol or glycol ether and water. The dye may be any of the anionic or cationic dyes. The dye is typically present in an amount ranging from about 1 to 12% (by weight), although more or less dye may be used, depending on the vehicle/dye system, the desired optical density, etc. Typically, the dye concentration is about 2 to 6% (by weight). All amounts herein are by weight, unless otherwise indicated.

Particularly employed as dyes herein are Basic Violet 7 (BV7) and Basic Blue 3 (BB3). However, any of the well known dyes may alternately be used.

The particular water-soluble organic compounds and their concentrations does not form a part of this invention. However, examples of such compounds include glycols such as ethylene glycol, diethylene glycol, propylene glycol, polyethylene glycol, etc., and pyrrolidones, such as 2-pyrrolidone. Usually, the glycol is present in an amount up to about 50%, and more typically about 1 to 10%, with the balance water. The pyrrolidone is usually present in an amount of about 7 to 10%, with the balance water.

Other additives may be added to the ink, such as fungicides, bactericides, pH adjusters, and the like, as is well-known. Such additives, and the materials comprising the vehicle and dye are of a purity commonly found in normal commercial practice.

In accordance with the invention, the addition of an organic sulfonic acid salt significantly reduces kogation, and may even eliminate it entirely. Preferred examples of such organic sulfonic acid salts include sodium methane sulfonate, sodium 4-toluenesulfonate, and sodium propene 1-sulfonate.

Organic sulfonic acid salts have been used as inert salts in electroplating baths for some time. Compounds such as $R-SO_{14}^{-}M^{+}$, where $M^{+}$ is $Na^{+}$, $Li^{+}$, $K^{+}$, $NH_4^{+}$, $R_3N^{+}$, etc. and where R is $-CH_3$, $-C_2H_5$, or any length aliphatic, branched or otherwise, or any aryl group, such as $-C_6H_4-X$, where X is Cl, Br, $NO$,, $CH_3$, etc. are attractive because of their electrochemical and thermal stability over a wide variety of conditions. They are also pH insensitive, because all sulfonic acids are completely ionized in aqueous solutions. The attractive feature of the organic radical allows "tailoring" the amount of hydrophobicity the salt can have.

The selection of the counter-ion ($H^+$) is not critical, other than it not adversely interfere with the reduction in kogation. Examples of suitable cations include alkali metals, ammonium, and alkyl ammonium. An especially efficacious salt is sodium methane sulfonate.

For thermal ink-jet inks, the thermal and electrochemical stability of the alkyl or aryl sulfonates is attractive. Unlike phosphorus-containing salts that may be toxic, pH sensitive and labile, these sulfonated compounds are relatively non-toxic, stable strong electrolytes.

The amount of organic acid sulfonate added ranges from about 0.3 to 6 wt %, and is somewhat dependent on the dye employed. The reason for this dependency is not clear at the present time, but the additive may affect the solution chemistry of dyes, that is, the state of aggregation of the dye. Too low a concentration may not be effective, while too high a concentration results in crusting of the ink in the printhead and/or precipitation of the dye. Preferably, the amount of organic acid sulfonate is at least about 1 wt %.

Inks were prepared, using a vehicle comprising 5.5% diethylene glycol, 0.3% Nuosept C (a biocide), and the balance water. An amount of BV7 dye to provide $Abs_{548nm}=0.16$ was added to make the ink. To each ink was added one of the following additives: 0.1%, 0.5%, 1%, 3%, or 5% sodium methane sulfonate (NaO-SO$_2$Me) or 0.1% sodium 4-toluenesulfonate (NaOTs).

As indicated earlier, kogation accompanied with decreased drop volumes degrades pen performance. A decrease in pen performance can be monitored by measuring (weighing) drops fired from a pen. A change in drop volume indicates the formation of resistor residues.

In the test, droplets ejected from a pen are collected and weighed in a pan on an analytical balance. An average weight is obtained and is commonly referred to as drop volume in picoliters (pL). The present test operates at three different energies (15%, 30%, 45%) over that required to fire a droplet from a nozzle in order to obtain a range of performance (OE). In a given printer and a given pen under normal operating conditions, a pen will be operating at a single energy.

In the Figures, the dashed line represents 15% OE, the heavy solid line represents 30% OE, and the light solid line represents 45% OE. The light solid line shown in the Figures as -C-C- represents a separate control group of nozzles on the pen, fired at 30% OE.

Figure 1A:
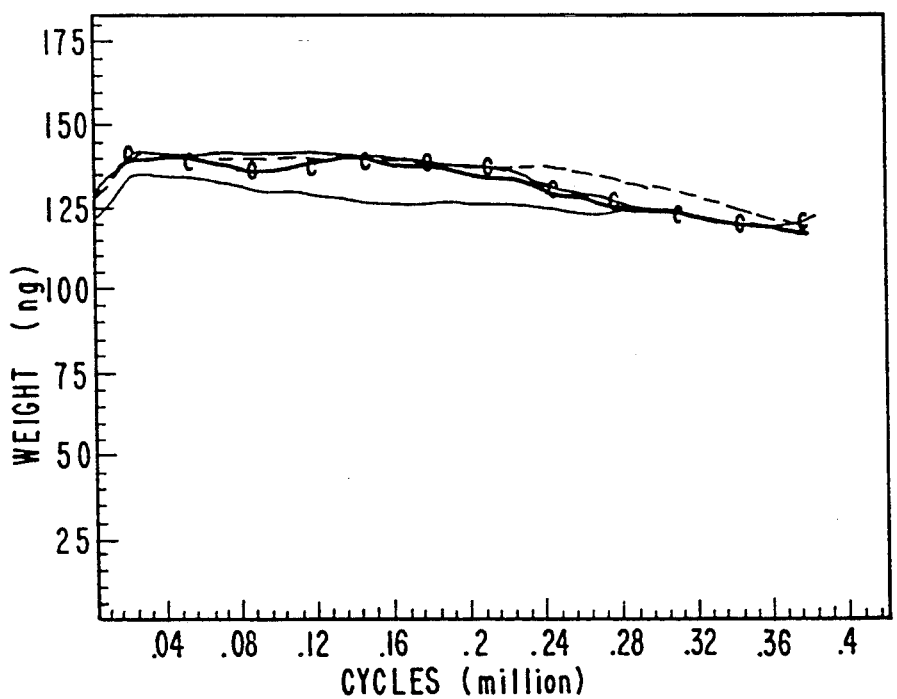
Figure 2B:
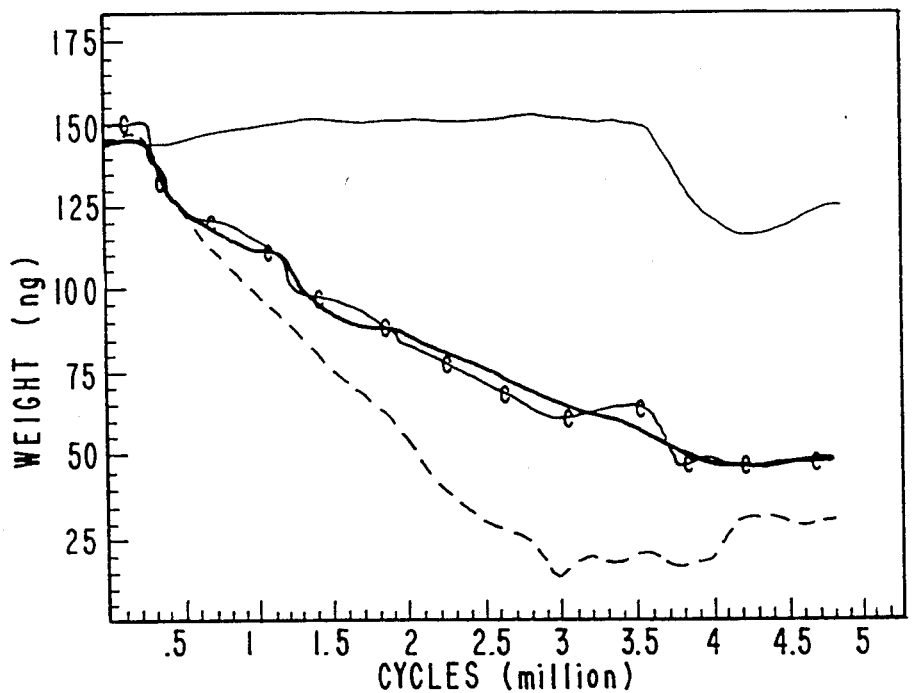
FIGS. 2-8 are plots similar to that of FIG. 1, but for an ink containing an additive of the invention at various concentrations, depicting less roll-off of drop volume with increasing additive of the invention, with the "a" Figures depicting results out to 0.4 million cycles and the "b" Figures depicting results out to 5 million cycles.
Figure 2A:
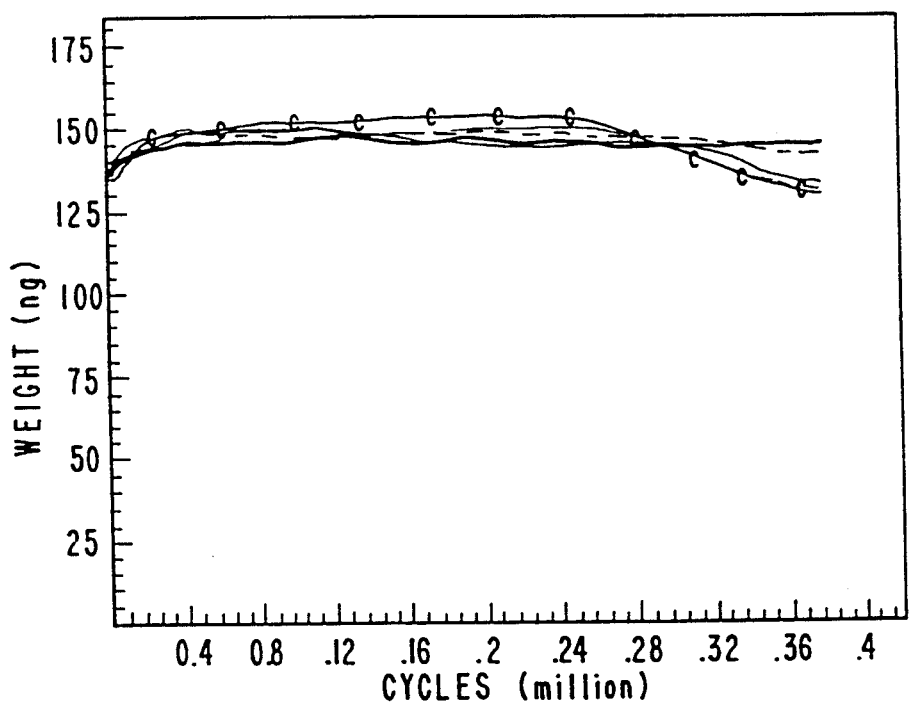
Figure 3B:
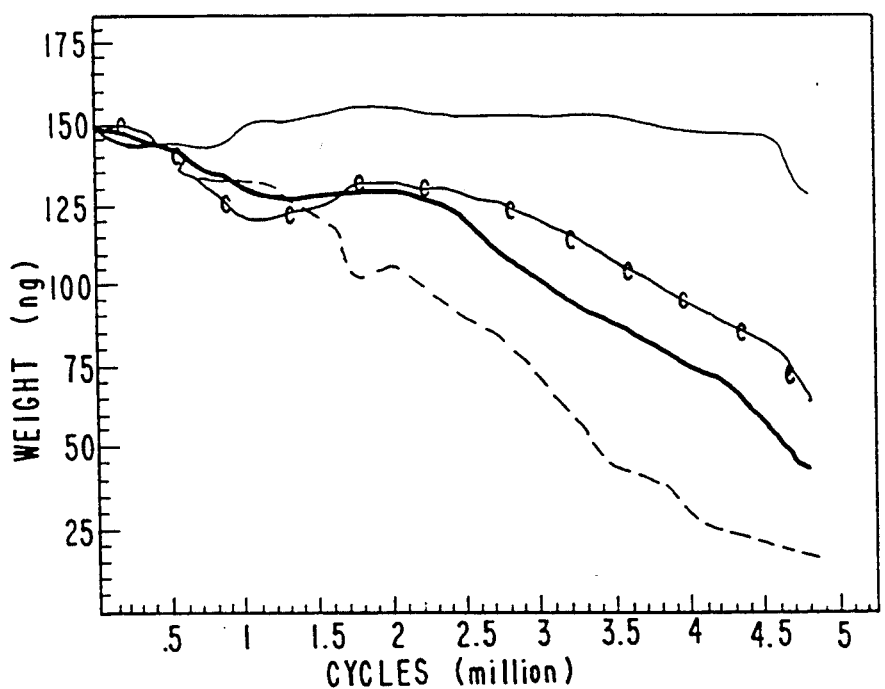
Figure 3A:
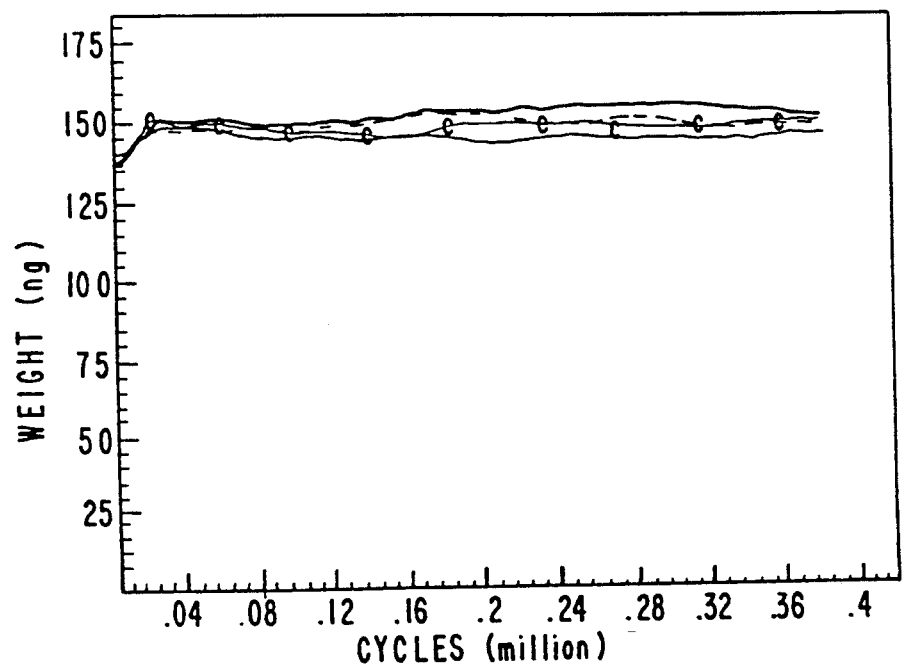
Figure 4B:
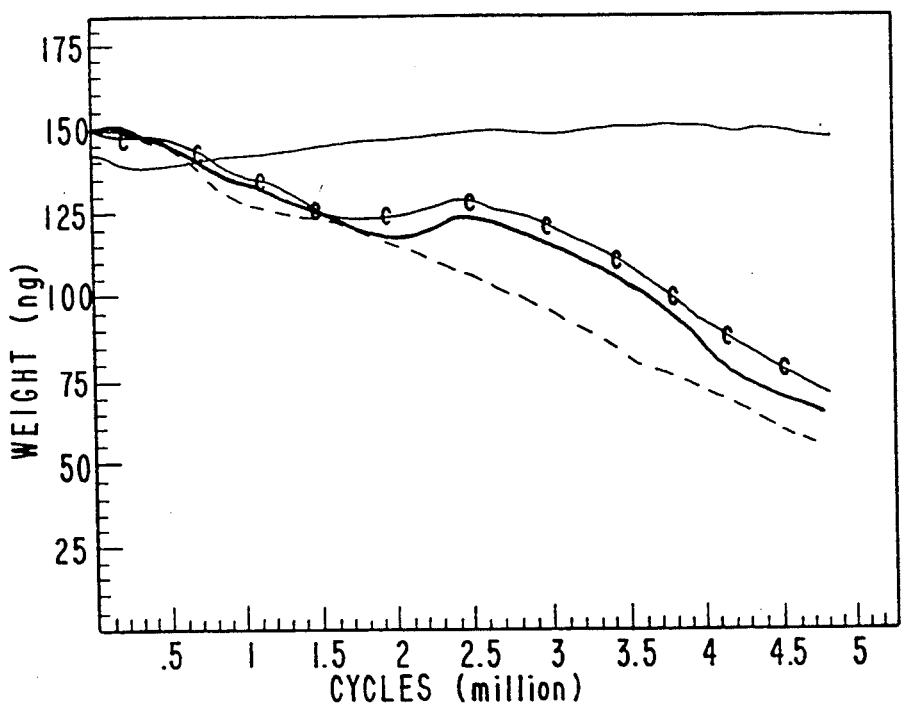
Figure 4A:
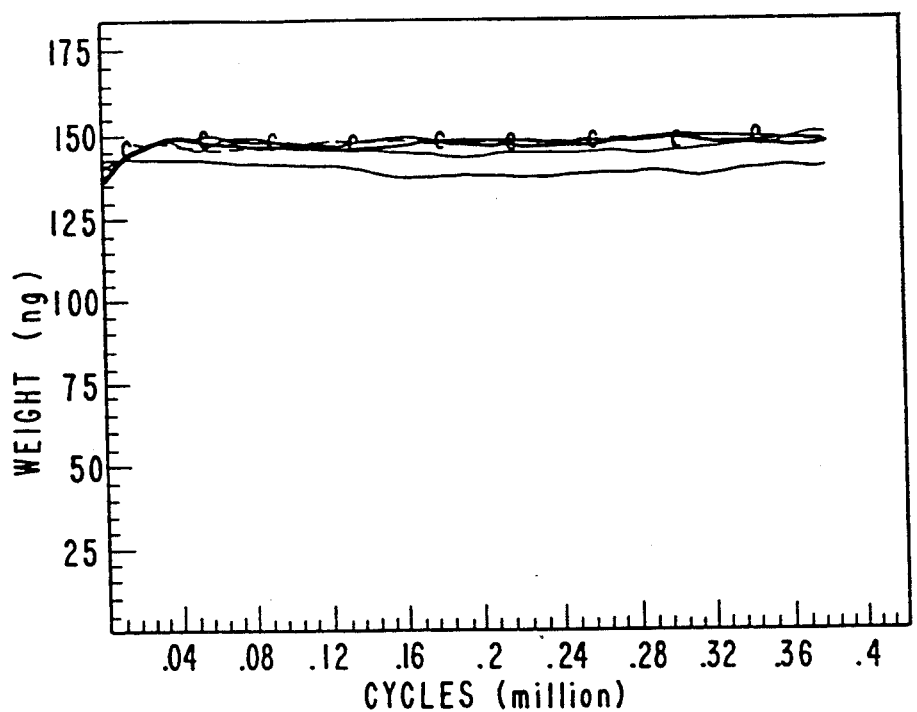
Figure 5B:
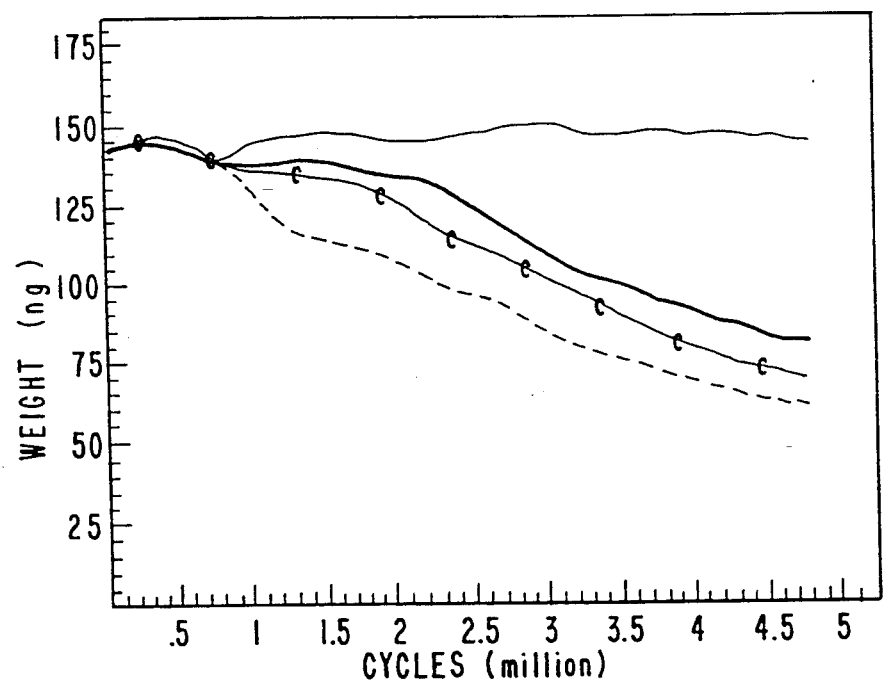
Figure 5A:
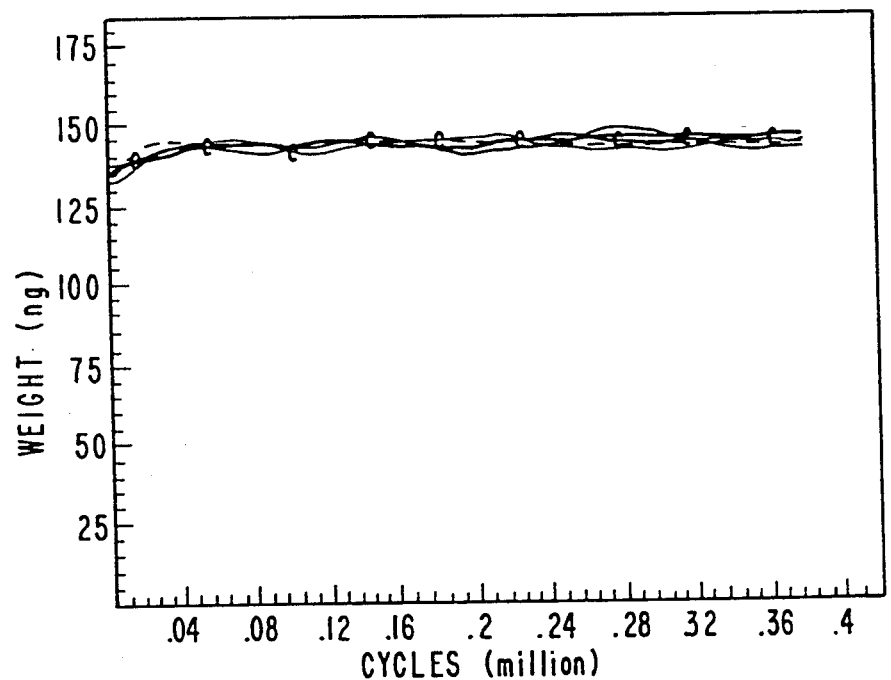
Figure 6B:
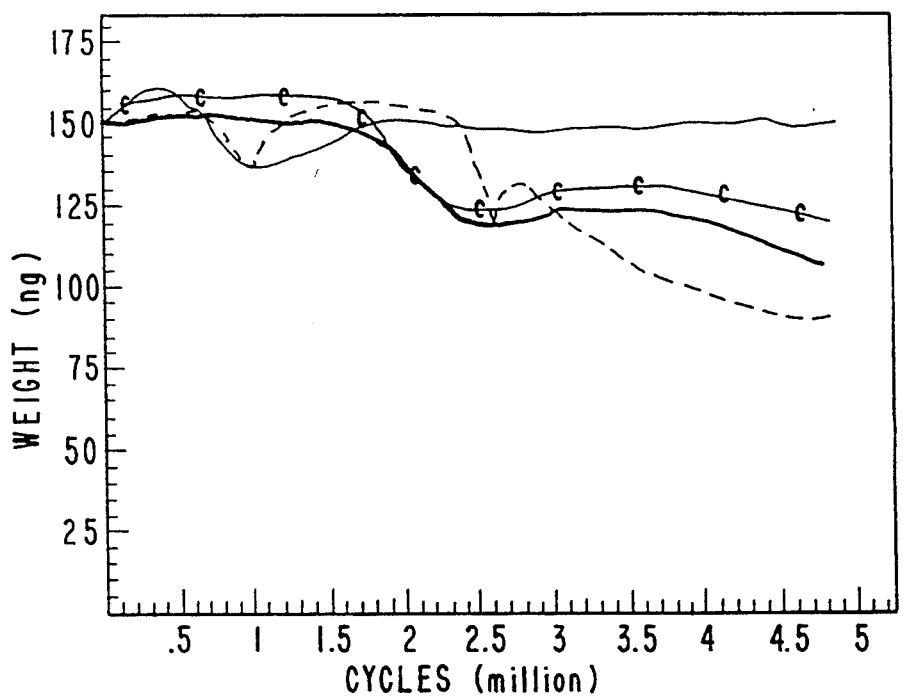
Figure 6A:
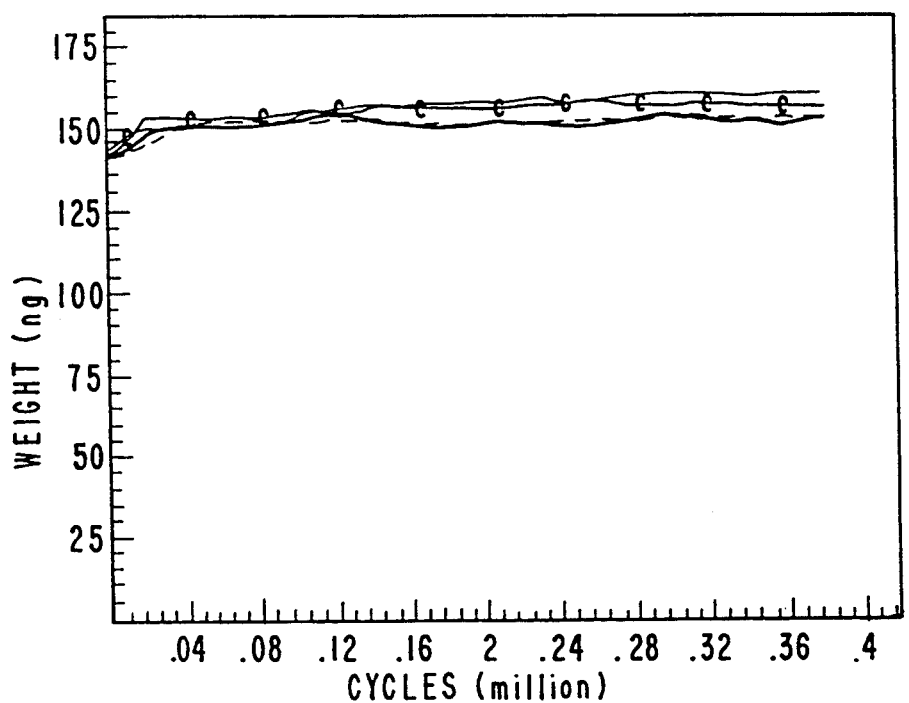
Figure 7B:
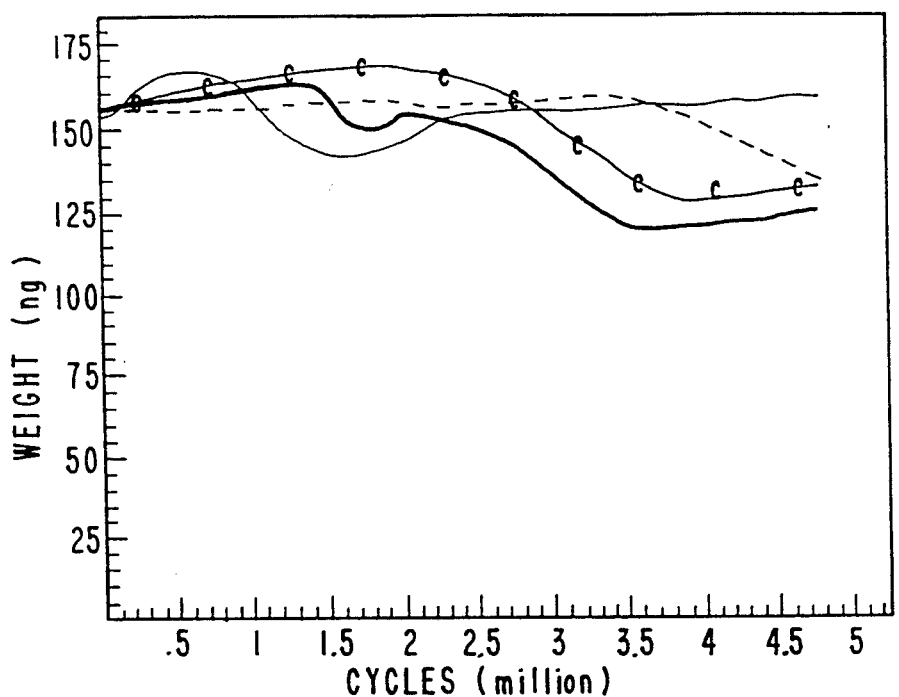
Figure 7A:
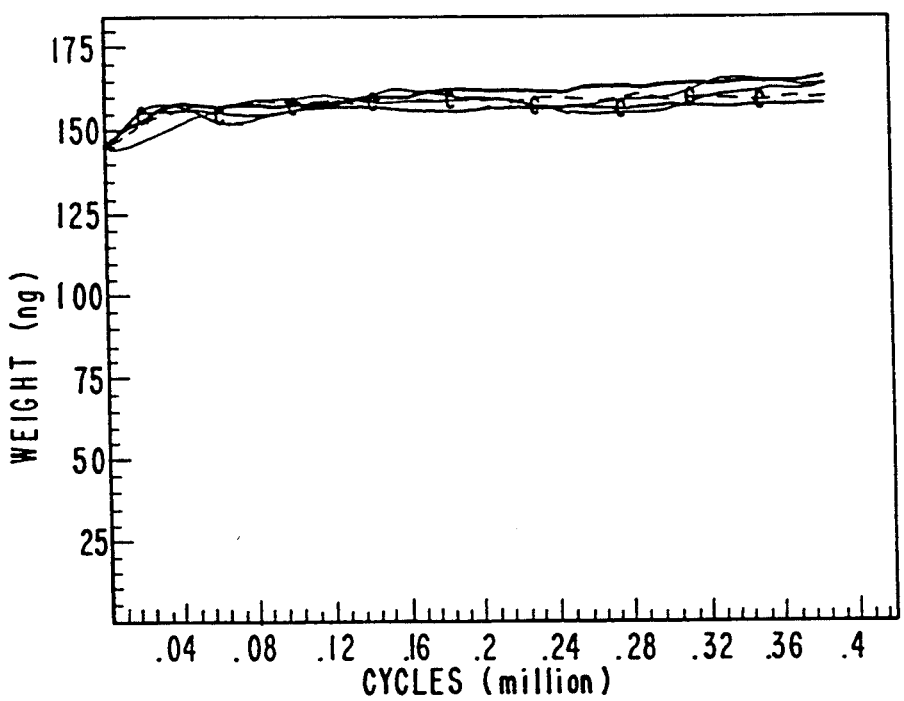
Figure 8B:
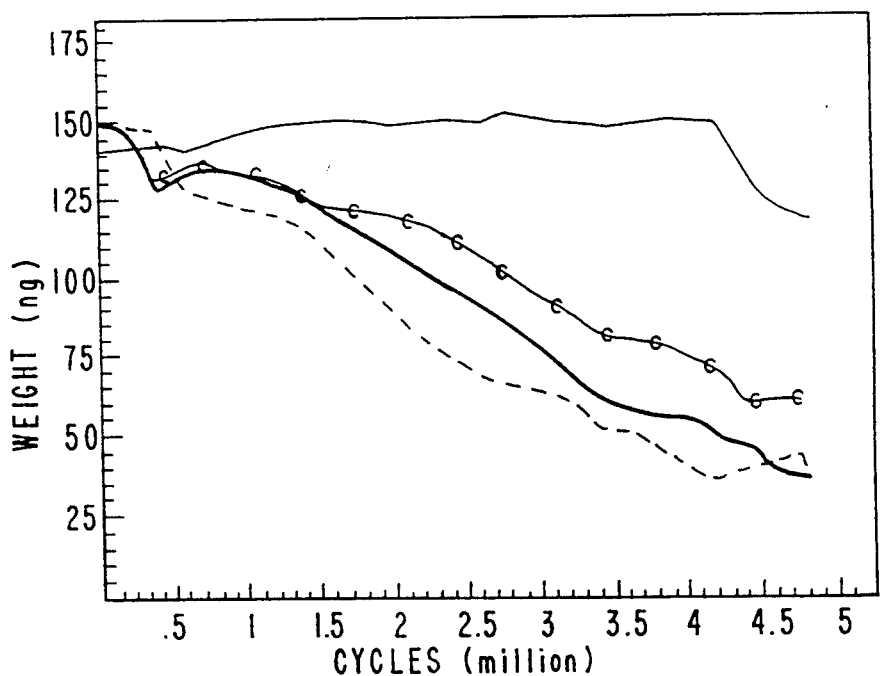
Figure 8A:
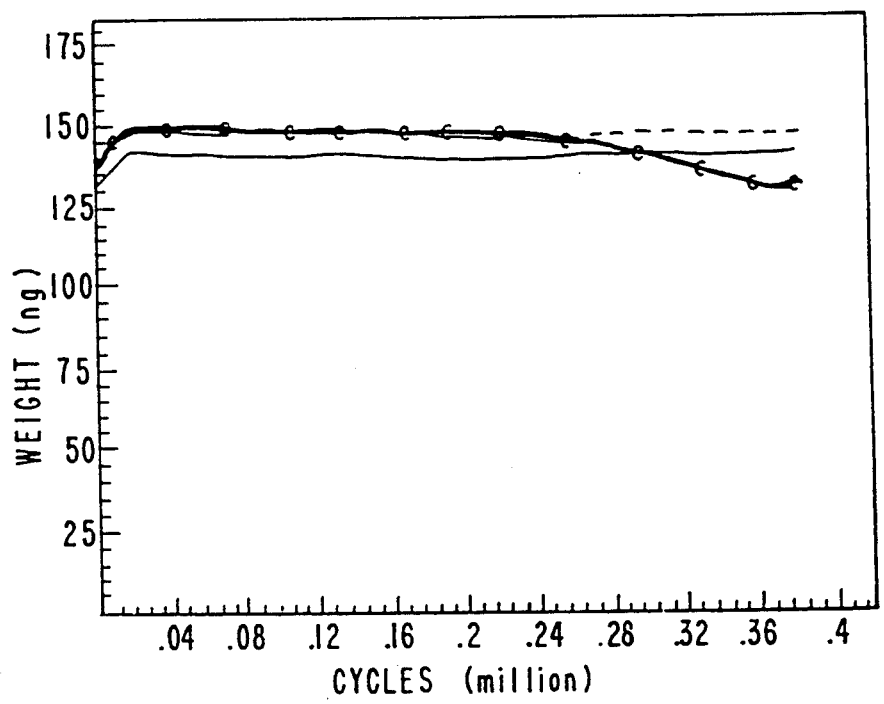

FIGS. 1a and 1b depict a measure of kogation from an ink having the composition given above, without any organic acid sulfonate. It is clear that there is a large decrease in drop volume (determination is by weight) with this ink, beginning almost immediately.

For comparison, kogation results for the same base ink composition with varying amounts of sodium methane sulfonate and with sodium 4-toluene sulfonate, as described above, are depicted in FIGS. 2–8. The addition of sodium methane sulfonate clearly yields less roll-off of drop volume with pen life. The inks of the invention evidence substantial roll-off alleviation out to 5 million cycles.

With increasing amount of sodium methane sulfonate, there is less roll-off of drop volume with pen life; however, concentrations greater than about 6% cause precipitation of the dye. Although the variation of drop volume is about ±25 pL over all over-energies, there is a distinct improvement over the ink without the additive.

INDUSTRIAL APPLICABILITY

The organic acid sulfonate additive of the invention is expected to find use in inks used in thermal ink-jet printers.

Thus, there has been disclosed an additive for reducing or eliminating kogation in inks used in thermal ink-jet printers. It will be readily apparent to those skilled in this art that various changes and modifications of an obvious nature may be made, and all such changes and modifications are considered to fall within the scope of the invention as defined by the appended claims.

What is claimed is:

1. A thermal ink-jet ink comprising a vehicle and a dye, characterized by the presence of about 0.3 to 6 wt % of at least one organic acid sulfonate therein, said sulfonate selected from the group consisting of R—SO$_3^-$M$^+$ salts, wherein M$^+$ is a cation selected from the group consisting of Na$^+$, Li$^+$, K$^+$, NH$_4^+$, and R'$_4$N$^+$, wherein R is an organic moiety selected from the group consisting of aliphatic groups and —C$_6$H$_4$—X, where X is Cl, Br, NO$_2$, or CH$_3$, and wherein R' is an alkyl group.

2. The ink of claim 1 wherein said vehicle comprises at least one glycol and the balance water.

3. The ink of claim 2 wherein said vehicle comprises from about 1 to 10 wt % diethylene glycol and the balance water.

4. The ink of claim 1 wherein said vehicle comrpises at least one pyrrolidone and the balance water.

5. The ink of claim 4 wherein said vehicle comrpises from about 7 to 10 wt % 2-pyrrolidone and the balance water.

6. The ink of claim 1 comprising about 1 to 12 wt % of a catonic or anionic dye.

7. The ink of claim 7 wherein R is an organic moiety selected from the group consisting of —CH$_3$ and —C$_2$H$_5$.

8. The ink of claim 1 wheren said at least one organic acid sulfonate consists essentially of a member selected from the group consisting of sodium methane sulfonate, sodium 4-toluenesulfonate, and sodium propene -1-sulfonate.

9. The ink of claim 1 whrein said amount of organic acid sulfonate is at least about 1 wt %.

10. A thermal ink-jet ink comprising a vehicle comprising about 1 to 10 wt % diethylene glycol or about 7 to 10 wt % 2-pyrrolidone and the balance water and about 1 to 12 wt % of a cationic or anionic dye, characterized by the presence of about 0.3 to 6 wt % of at least one organic acid sulfonate therein selected from the group consisting of R—SO$_3^-$M$^+$ salts, wherein M$^+$ is a cation selected from the group consisting of Na$^+$, Li$^+$, K$^+$, NH$_4^+$, and R'$_4$N$^+$, wherein R is an organic moiety selected from the group consisting of aliphatic groups and —C$_6$H$_4$—X, where S is Cl, Br, NO$_2$, or CH$_3$, and wherein R' is an alkyl group.

11. The ink of claim 10 wherein R is an organic moiety selected from the group consisting of —CH$_3$ and —C$_2$H$_5$.

12. The ink of claim 10 wherein said at least one organic acid sulfonate consists essentially of a member selected from the group consisting of sodium methane sulfonate, sodium 4-toluenesulfonate, and sodium propene-1-sulfonate.

13. An ink for thermal ink-jet printing comprising a vehicle comprising about 1 to 10 wt % diethylene glycol and the balance water and about 1 to 12 wt % of a cationic or anionic dye, characterized by the presence of about 1 to 6 wt % of sodium methane sulfonate therein.

14. A method of reducing kogation in an ink used in thermal ink-jet printers, said ink comprising a vehicle and a dye, characterized in that about 0.3 to 6 wt % of at least one organic acid sulfonate is added thereto, said sulfonate selected from the group consisting of R—$SO_3^-M^+$ salts, wherein $M^+$ is a cation selected from the group consisting of $Na^+$, $Li^+$, $K^+$, $NH_4^+$, and $R'_4N^+$, wherein R is an organic moiety selected from the group consisting of aliphatic groups and —$C_6H_4$—X, where X is Cl, Br, $NO_2$, or $CH_3$, and wherein R' is an alkyl group.

15. The method of claim 14 wherein R is an organic moiety selected from the group consisting of —$CH_3$ and —$C_2H_5$.

16. The method of claim 14 wherein said at least one organic acid sulfonate consists essentially of a member selected from the group consisting of sodium methane sulfonate, sodium 4-toluenesulfonate, and sodium propene-1-sulfonate.

17. The method of claim 14 wherein said amount of organic acid sulfonate is at least about 1 wt %.

18. A method of reducing kogation in an ink used in thermal ink-jet printers, said ink comprising a vehicle comprising about 1 to 10 wt % diethylene glycol or about 7 to 10 wt % 2-pyrrolidone and the balance water and about 1 to 12 wt % of a cationic or anionic dye, characterized by the presence of about 0.3 to 6 wt % of at least one organic acid sulfonate therein selected from the group consisting of R—$SO_3^-M^+$ salts, wherein $M^+$ is a cation selected from the group consisting of $Na^+$, $Li^+$, $K^+$, $NH_4^+$, and $R'_4N^+$, and wherein R is an organic moiety selected from the group consisting of aliphatic groups and —$C_6H_4$—X, where X is Cl, Br, $NO_2$, or $CH_3$ and R' is an alkyl group.

19. The method of claim 18 wherien R is an organic moiety selected from the group consisting of —$CH_3$ and —$C_2H_5$.

20. The method of claim 18 wherein said at least one organic acid sulfonate consists essentially of a member selected from the group consisting of sodium methane sulfonate, sodium 4-toluenesulfonate, and sodium propene-1-sulfonate.

21. A method of reducing kogation in an ink used in thermal ink-jet printers, said ink comprising a vehicle comprising about 1 to 10 wt % diethylene glycol and the balance water and about 1 to 12 wt % of a cationic or anionic dye, characterized in that about 1 to 6 wt % of sodium methane sulfonate dye therein.

* * * * *